US007062268B2

(12) United States Patent
McKenna

(10) Patent No.: US 7,062,268 B2
(45) Date of Patent: Jun. 13, 2006

(54) OVERLAPPING SPECTRUM CELLULAR COMMUNICATION NETWORKS

(75) Inventor: Daniel Bernard McKenna, Steamboat Springs, CO (US)

(73) Assignee: AirCell, Inc., Louisville, CO (US)

( * ) Notice: Subject to any disclaimer, the term of this patent is extended or adjusted under 35 U.S.C. 154(b) by 3 days.

(21) Appl. No.: 10/756,491

(22) Filed: Jan. 13, 2004

(65) Prior Publication Data

US 2004/0147243 A1 Jul. 29, 2004

Related U.S. Application Data

(63) Continuation-in-part of application No. 09/686,923, filed on Oct. 11, 2000, now Pat. No. 6,788,935, which is a continuation-in-part of application No. 09/379,825, filed on Aug. 24, 1999, now Pat. No. 6,408,180, which is a continuation-in-part of application No. 08/960,183, filed on Oct. 29, 1997, now Pat. No. 6,108,539, which is a continuation-in-part of application No. 08/709,417, filed on Sep. 6, 1996, now Pat. No. 5,878,346, which is a continuation-in-part of application No. 08/027,333, filed on Mar. 8, 1993, now Pat. No. 5,444,762, and a continuation-in-part of application No. 07/847,920, filed on Mar. 6, 1992, now Pat. No. 5,557,656.

(51) Int. Cl.
*H04Q 7/20* (2006.01)

(52) U.S. Cl. ............... 455/431; 455/427; 455/13.1; 455/11.1

(58) Field of Classification Search ........... 455/431, 455/427, 11.1, 422.1, 12.1, 13.1, 552.1, 76, 455/553.1, 426.1
See application file for complete search history.

(56) References Cited

U.S. PATENT DOCUMENTS

| 5,557,656 | A | * | 9/1996 | Ray et al. .................. 455/431 |
|5,559,865|A| |9/1996|Gilhousen|
|5,963,852|A|*|10/1999|Schlang et al. .............. 455/76|
|6,014,561|A|*|1/2000|Molne .................... 455/553.1|
|6,104,926|A|*|8/2000|Hogg et al. ................ 455/431|
|6,108,539|A|*|8/2000|Ray et al. .................. 455/431|
|6,269,243|B1| |7/2001|Corbefin|
|6,735,438|B1|*|5/2004|Sabatino ................... 455/427|
|6,748,221|B1|*|6/2004|Peltola .................... 455/552.1|
|6,778,825|B1|*|8/2004|Parkman .................. 455/427|
|2005/0020203|A1|*|1/2005|Losh et al. ............... 455/11.1|
|2005/0153736|A1|*|7/2005|Ganton ................... 455/426.1|

\* cited by examiner

FOREIGN PATENT DOCUMENTS

EP 0 932 266 A1 7/1999

OTHER PUBLICATIONS

Casewell, I.E., The provisions of GSM cellular radio environments within passenger aircraft operating over Europe, Racal Research Limited, Walton-on-Thames, U.K. pp. 172-176.

*Primary Examiner*—Lana Le
(74) *Attorney, Agent, or Firm*—Patton Boggs LLP

(57) ABSTRACT

The overlapping spectrum cellular communication network functions to provide multiple cellular communication systems in the same spectrum as the existing NATS-based cellular communication system, while also providing wideband services to subscribers. This is accomplished by enabling two system operators to each have a dedicated 1.25 MHz slice of the NATS spectrum. However, given that there is only 2 MHz available, this results in a 0.50 MHz overlap of 1.25 MHz carriers. To mitigate the inter-network overlap and the potential for interference between the two systems, the overlapping spectrum cellular communication network swaps forward and reverse path allocations on a per system basis.

18 Claims, 3 Drawing Sheets

40 % overlap

OVERLAPPING SPECTRUM CELLULAR COMMUNICATION NETWORKS

CROSS-REFERENCE TO RELATED APPLICATIONS

This application is a continuation-in-part of U.S. patent application Ser. No. 09/686,923 filed Oct. 11, 2000 now U.S. Pat. No. 6,788,935 titled "Aircraft-Based Network for Wireless Subscriber Stations", which is a continuation-in-part of Ser. No. 09/379,825 now U.S. Pat. No. 6,408,180 filed Aug. 24, 1999 and titled "Ubiquitous Subscriber Station", which is continuation-in-part of Ser. No. 08/960,183 now U.S. Pat. No. 6,108,539, filed Oct. 29, 1997 and titled "Non-Terrestrial Subscriber Station", which is a continuation-in-part of Ser. No. 08/790,417 now U.S. Pat. No. 5,878,346, filed Sep. 6, 1996 and titled "Multi-Dimensional Mobile Cellular Communication Network," which is a continuation-in-part of Ser. No. 08/027,333 now U.S. Pat. No. 5,444,762, filed Mar. 8, 1993 and titled "Method and Apparatus for Reducing Interference Among Cellular Telephone Signals" and Ser. No. 07/847,920 now U.S. Pat. No. 5,557,656, filed Mar. 6, 1992 and titled "Mobile Communications".

FIELD OF THE INVENTION

This invention relates to cellular communications and, in particular, to a network that enables wireless subscriber stations to receive enhanced wireless communication services in the non-terrestrial region.

PROBLEM

It is a problem in the field of wireless communications to manage the maintenance of the services provided to the wireless subscriber as they roam among cell sites in the cellular communication network. This ability to provide wireless mobility requires that the wireless subscriber have continual access to the Public Switched Telephone Network (PSTN), the Public Switched Data Network (PSDN), and the Internet, independent of the wireless subscriber's location. In addition, the wireless subscriber should have the ability to originate and receive calls and/or data messages in a unified manner, regardless of their location, and these calls as well as any ancillary services should be handled uniformly by whatever wireless system is presently serving the wireless subscriber. This problem is especially pertinent in cases where wireless subscribers are located in an environment that is not included in the intended service area of terrestrial wireless systems, such as in aircraft or on off-shore ships.

In the field of non-terrestrial cellular communications, this problem is addressed by one service which makes use of the NATS spectrum to provide subscribers, who are located in an aircraft, with cellular communication services. The NATS spectrum comprises two 2 MHz wide bands, each used to transmit signals unidirectionally in one direction between the aircraft and the ground (forward path and reverse path), which bands extend from 849 to 851 MHz (reverse) and from 894 to 896 MHz, (forward), respectively. The cellular communication service that is presently provided in the NATS spectrum uses either analog Frequency Modulation or narrowband digital modulation (in either case having a 6 KHz spectral envelope per voice channel) on a pair of radio frequency carriers for each cellular call and is therefore a member of the Frequency Division Multiple Access (FDMA) class of cellular services. The difficulty with this existing cellular communication system is that it provides only a limited number of channels in the NATS spectrum and is therefore call capacity limited. In addition, this existing cellular communication system only provides narrow band services and cannot serve present and future broadband applications.

Thus, the existing use of the NATS spectrum/architecture plan fails to provide non-terrestrial cellular subscribers with adequate communication services.

SOLUTION

The above described problems are solved and a technical advance achieved by the present overlapping spectrum cellular communication network which functions to provide multiple cellular communication systems in the same spectrum as the existing NATS-based cellular communication system, while also providing wideband services to subscribers. This is accomplished by enabling two cellular communication systems to each have a dedicated 1.25 MHz slice of the existing 2 MHz NATS spectrum in both the forward path and reverse path directions. However, given that there is only 2 MHz of this spectrum available in each of the forward path and reverse path, this results in a 0.50 MHz overlap of the two 1.25 MHz carriers in each of the forward path and reverse path. To mitigate the inter-system overlap and the potential for interference between the two systems, the overlapping spectrum cellular communication network swaps the forward and reverse path allocations on a per system basis. In particular, in the 849–851 MHz spectrum, a first system provides the forward path for its channels while the second system provides the reverse path for its channels and similarly in the 894–896 MHz spectrum where the first system provides the reverse path for its channels while the second system provides the forward path for its channels.

By using this architecture, as well as implementing a Code Division Multiple Access (CDMA) communication space, the present overlapping spectrum cellular communication network overcomes the problems noted above with respect to the present NATS-based cellular communications.

DETAILED DESCRIPTION

Figure 1:
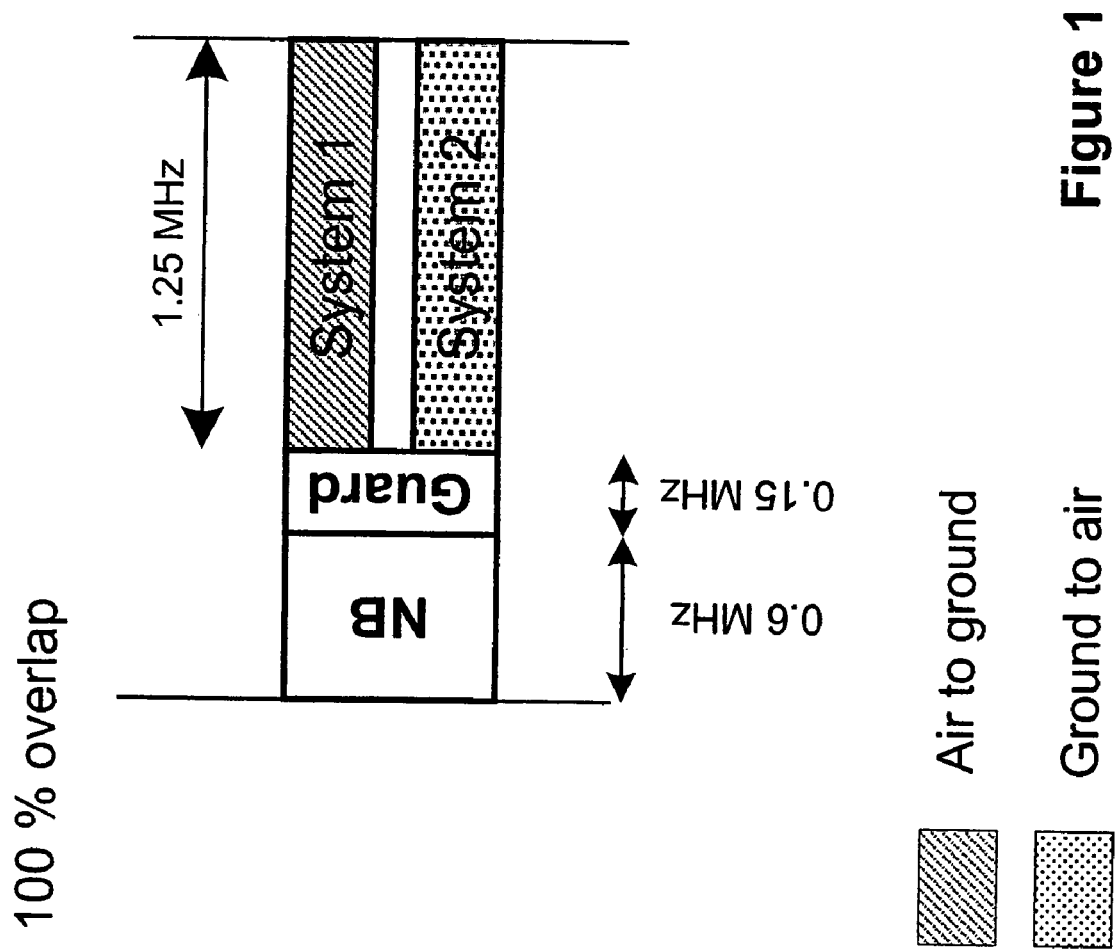
FIG. 1 illustrates the spectrum usage in the existing NATS-based cellular communication system.
Figure 2:
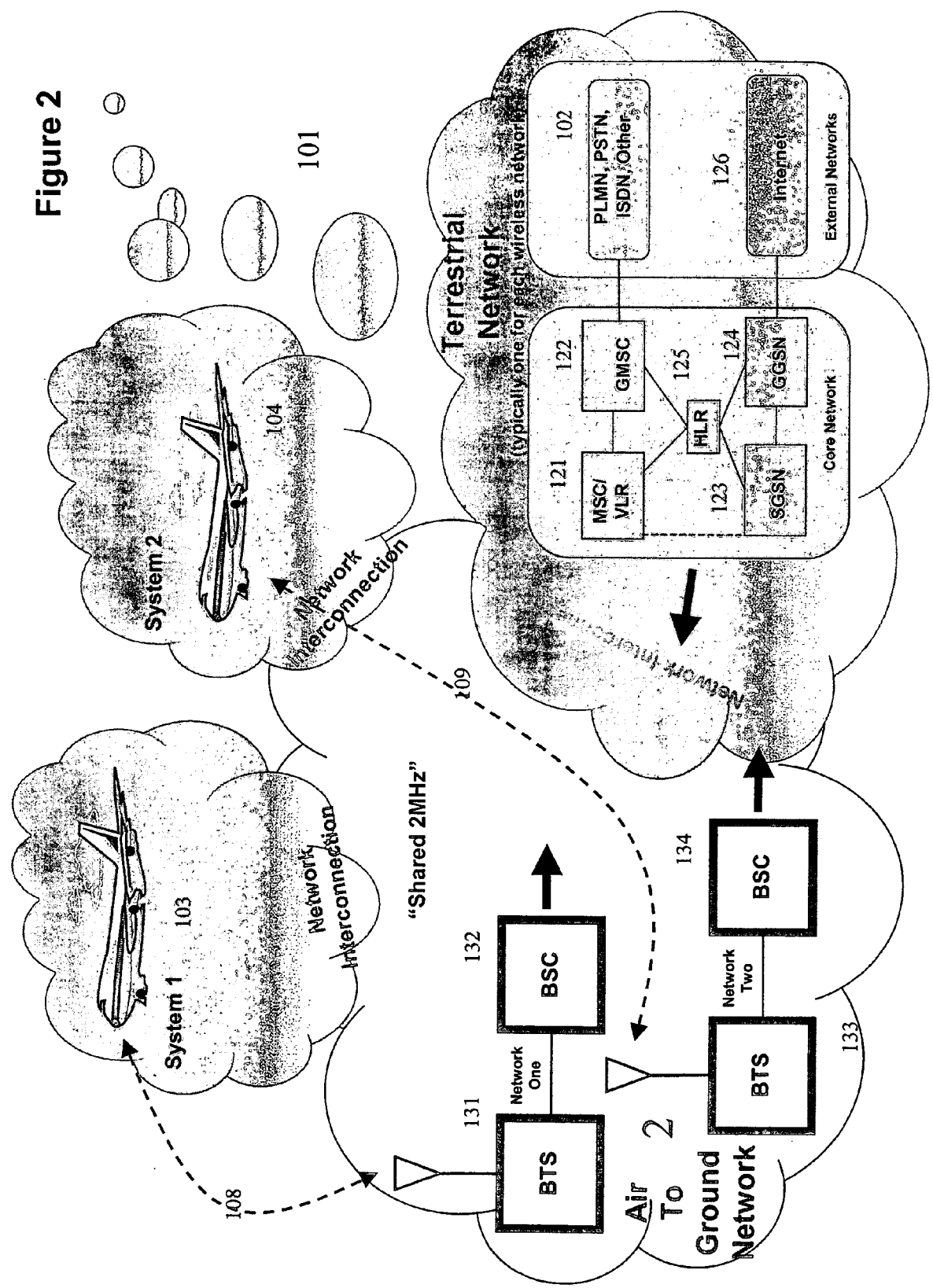
FIG. 2 illustrates in block diagram form the overall architecture of the present overlapping spectrum cellular communication network and a typical operational environment.

Cellular wireless communication systems provide the service of connecting wireless communication customers, each having a wireless subscriber device, to both land-based customers who are served by the common carrier public telephone network as well as other wireless communication customers. In such a system, if the traffic is circuit switched, all incoming and outgoing calls are routed through a wireless network switch, commonly referred to as a Mobile Switching Center (MSC) or Mobile Telephone Switching Office (MTSO), each of which is connected to a Base Station Subsystem consisting of one or more Base Station Controllers (BSCs), and a plurality of Base Transceiver Stations (BTSs). Each Base Transceiver Station communicates with wireless subscriber devices located within its service area, with the Base Transceiver Stations geographically arranged to collectively provide contiguous service over a large service region. Each Base Transceiver Station in the service region is connected by communication links to a Base Station Controller, and the Base Station Controller is connected by additional communications links to the Mobile Switching Center. Each Base Transceiver Station contains a one or more radio transceivers, with the number of transceivers being dependent upon the subscriber traffic generated within the coverage area of the Base Transceiver Station.

The terms "cell site" and "cell" are sometimes loosely used in the literature, and the term "cell site" generally denotes the locations of the Base Transceiver Stations, while the term "cell" generally denotes the region of space which is served by a particular set of transceivers and associated antenna system at a cell site. A "sector" generally refers to the sector-shaped coverage area created when multiple directional antenna systems are used at a cell site to provide greater capacity and/or coverage by sub-dividing the nominally circular coverage area surrounding a cell site into a corresponding number of cells. The particular technology used to implement the communications between wireless subscriber devices and the transmitter-receiver pairs as well as the nature of the data transferred there between, be it voice, video, telemetry, computer data, and the like, are not limitations to the system which is described herein, since a novel system concept is disclosed, rather than a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated transmitter-receiver pairs located at the cell site for each of these cells.

Existing Cellular Technologies

There are several cellular standards or Common Air Interfaces which have widespread use in the wireless industry. The following are examples of typical characteristics of such systems, which all share the common trait of reusing RF channels with a "cellular" reuse pattern.

Advanced Mobile Phone Service (AMPS) utilizes an analog Frequency Modulation on a pair of radio frequency carriers for each cellular call and is therefore a member of the Frequency Division Multiple Access (FDMA) class of cellular services. The AMPS network has a control channel allocation on a per cell/sector basis. The wireless subscriber device "camps on" to the shared control channel when inactive and exchanges signaling information required to assign dedicated traffic channels when required in order to complete inbound or outbound calls. AMPS calls are then set-up to the desired destination as described below. Handoffs of a wireless subscriber device between adjacent cells/sectors in AMPS are require that the subscriber device performs a frequency change as service changes from one cell/sector to the next.

Code Division Multiple Access (CDMA) systems use another basic form of multiple access. Central to the operation of CDMA is the development of a system of special code sequences (such as Walsh Codes) that are used to digitally modulate individual the digital traffic signals. The code sequences have the unique property of being "orthogonal" to each other, that is, each on can be completely distinguished from any of the others by mathematical manipulation of the signals—a property survives after modulation by the digital traffic signals. This allows multiple modulated code sequences to be used to modulate a single RF carrier and a receiver to be able to demodulate the complex signal and identify each of the original digitally coded "channels". Each of the original digital traffic signals is thereby recovered. Signaling channels for used to broadcast common information and information for specific subscriber devices are handled using the same coding techniques, using dedicated code channels.

Network capacity is expanded in a fashion similar to other cellular systems—by using additional RF channels at each network site and/or subdividing cells into smaller cells. The wireless subscriber device follows an acquisition/registration sequence that is somewhat similar to the FDM/TDM architectures. The mobile "listens" to the pilot channel (a given code word or sequence) from each nearby cell and orders the signals received by signal quality into sets: active, candidate, neighbor, and remaining. The mobile camps on the signal from the best cell and establishes synchronization to decode the broadcast information channels. The mobile can now, through well understood signaling means, perform the registration process and is then ready to receive or make calls. For example, an inbound call (base to mobile) is identified to the mobile via a paging channel (again code separated). The mobile responds it is ready to receive the call, the CDMA systems assigns a traffic code channel to which the mobile transitions and then begins communication with the inbound caller. CDMA has the ability to carry calls in what is termed "soft" handoff wherein the mobile is actually communicating the same content to more than one cell/sector in a time concurrent simultaneous fashion. Soft handoff improves the overall performance received due to the spatial diversity of the respective cells/sectors, and allows handovers to be performed using "make-before-break" handovers that gradually transitions service from one cell to a second cell as the subscriber device moves through the network. CDMA is also capable of hard handoffs, in which the connection to one cell is broken before the call is attached to the second cell, either with or without a change of the RF channel. This is most common between regions within a network or for calls handed off between network providers at the boundary of the two respective networks.

All of the aforementioned architectures operate in a full duplex mode with different RF channels for transmit and receive. Each pair of RF channels has a fixed frequency separation, with the base station transceivers generally operating on the RF channel with the higher frequency.

Call Connection

The first stage of a cellular communication connection is set up when a transmitter-receiver pair in a cell site, operating on a predetermined pair of radio frequencies, is turned on and a wireless subscriber device is tuned to the same pair of radio frequencies. The second stage of the communication connection is between this transmitter-receiver pair and the network interface that connects to the common carrier public telephone network or to another wireless communications system. This second stage of the communication connection is set up in the SSS (Switching Subsystem), which is connected to other networks by incoming and outgoing trunks and data connections. The Mobile Switching Center contains a switching network to switch mobile customer voice signals from the communication link to an incoming or outgoing trunk. A data switching node (PDSN—Packet Data Serving Node—in CDMA systems, or GGSN—Gateway GPRS Support Node—in GSM systems) similarly directs data traffic interconnecting to the public Public Switched Data Network (PSDN) or to other data networks. The Mobile Switching Center controls the actions of the associated Base Station Controllers by generating and interpreting the control messages that are exchanged over data links between the two. The Base Station Controllers at each cell site, in response to control messages from the Mobile Switching Center, control the transmitter-receiver pairs at the cell site (or code word assignment in the case of CDMA). The control processes at each cell site also control the tuning of the wireless subscriber devices to the selected RF channels, time slots and/or code words.

Each cell in the ground-based (terrestrial) cellular communication network comprises a volume of space radially arranged around the cell site transmitting antenna with the region of space typically approximating a cylindrical volume or a portion of a cylindrical volume having limited height. Since all the wireless subscriber devices are ground-based units (installed in motor vehicles or handheld units) in traditional cellular communication systems, the antenna radiation pattern of the cell site is aligned to be proximate to the ground. For some licensed frequency bands, including the US cellular band, the polarization of the signals produced by the cell site antenna is vertical in nature. For FDMA and FDMA/TDMA systems, in order to prevent the radio signals in one cell site from interfering with radio signals in an adjacent cell site the RF channels for adjacent cell sites are selected to be different, with sufficient frequency separation between adjacent transmitter frequencies to avoid overlapping transmissions among adjacent cell sites. In order to reuse a finite, small number of RF channels with distinct frequencies, the cellular communication industry has developed RF channel allocation patterns that ensures that two adjacent or nearby cell sites do not operate on the same RF Channel (unless they embody a CDMA architecture in which case a re-use pattern is employed in the code domain, i.e., PN codes, instead of frequency domain). When a ground-based wireless subscriber device initiates a call connection, control signals from the local cell site transmitter cause the frequency agile transceiver in the ground-based wireless subscriber device to operate on an RF channel designated for that particular cell. As the ground-based wireless subscriber device moves from one cell site to another, the call connection is handed off to successive cell sites and the frequency agile transceiver in the ground-based wireless subscriber device adjusts the traffic channel utilized by changing its RF channel and timeslot or code channel to correspond to that of the serving cell in which the ground-based wireless subscriber device is presently operational.

This existing ground-based cellular communication system is presently in widespread use and has been designed to eliminate the problem of frequency overlap among adjacent cell sites and to minimize the number of frequencies required to serve vast areas without encountering the possibility of excessive interference. These existing ground-based cellular communication systems, however, are inoperable when the user's wireless subscriber device is non-terrestrial in nature. In particular, the provision of cellular communication services to aircraft is inconsistent with the architecture of the existing ground-based cellular communication network since an airborne mobile subscriber device would be within the effective service area of multiple sites that are re-using the same traffic channel, and would therefore both be likely to receive and create significant levels of interference on the communications channel in use. The antenna patterns of the existing ground-based cellular communication system broadcasts signals in a pattern required to serve terrestrial wireless traffic requirements, and the pattern of RF channel re-use for the individual cells neither is designed to be extensible to providing service to aircraft traveling above the network.

Existing NATS-Based Non-Terrestrial Cellular Communication System

FIG. 1 illustrates the spectrum usage by the existing NATS-based cellular communication system (System 1) along with the introduction of two CDMA carriers (System 2) in a 100% overlap architecture. The purpose of this spectrum usage is to enable a transition between existing narrowband NATS and pure broadband NATS spectral architecture assignments. This system makes use of System 1 in the NATS spectrum to provide subscribers, who are located in an aircraft, with cellular communication services and adds the broadband CDMA 1.25 MHz carriers (System 2). In the NATS spectral plan, there are 10 channel blocks each having 29 channels each having a 6 KHz spectral envelope. Since this is an FDMA scheme (with many licensees sharing the same spectral resource), a frequency reuse factor of at least K=3 is necessary to avoid self interference. Originally there were 6 licensees of the NATS spectrum, together combined with the minimum K=3 plan, means that any given licensee would have 29/6 channels available at a given site (or around 4–5 narrowband voice channels). The present improvement described herein over this existing art realizes a factor of 16–32 times capacity enhancement within the same 2 MHz spectrum. In addition, the present NATS assignment plan requires all base stations to be located within one mile of each other since the channels are first-come demand assigned to a given licensee (with other licensee's networks "listening" to make sure a channel is not in use before assigning it). This is not a very efficient spectral allocation algorithm.

In contrast, the introduction of two 1.25 MHz broadband CDMA carriers changes the present paradigm by offering broadband services to aircraft (1+Mbps data rates).

Overlapping Spectrum Usage

Figure 3:
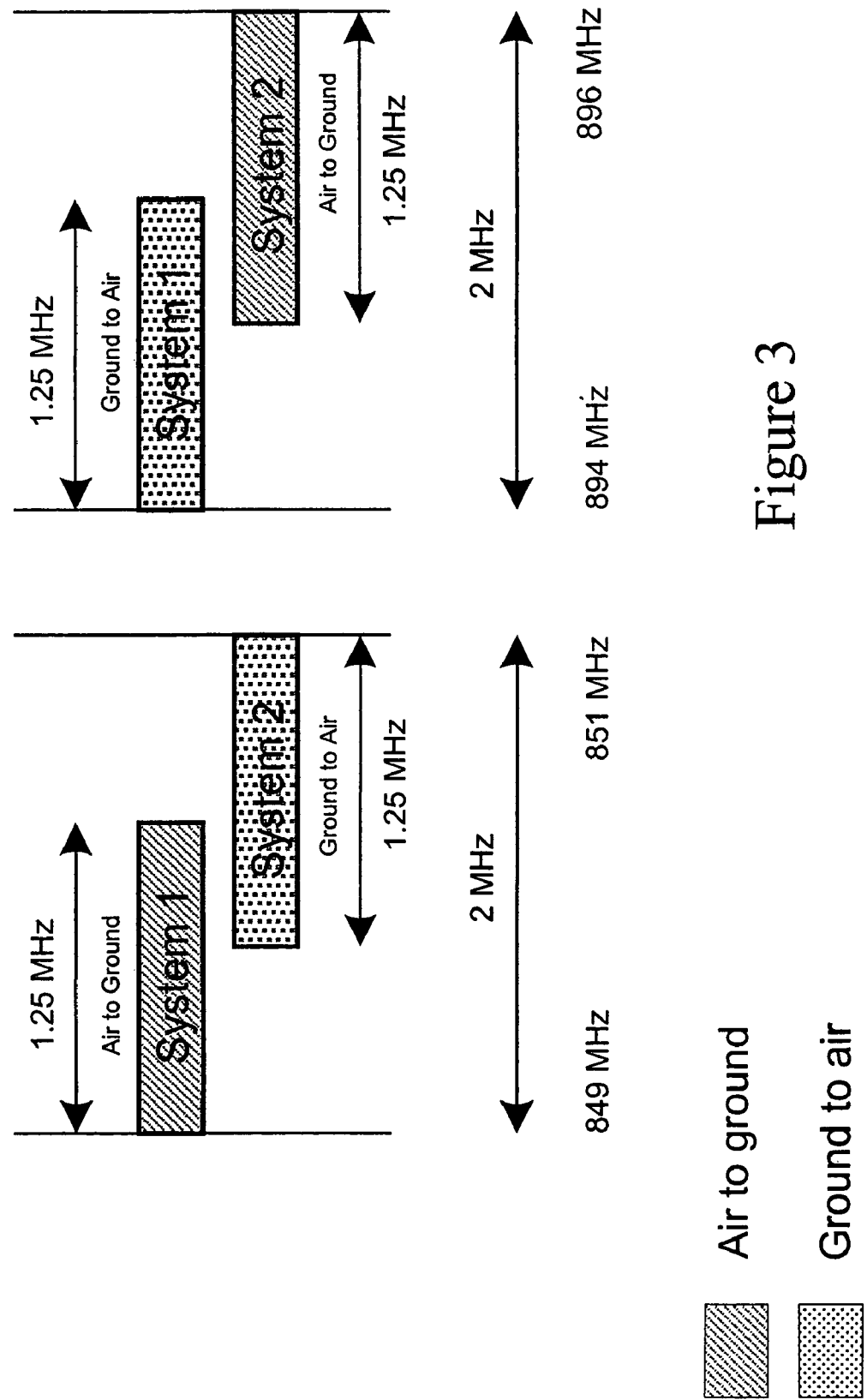
FIG. 3 illustrates the spectrum usage in the present overlapping spectrum cellular communication network.

FIG. 3 illustrates the spectrum usage in the present overlapping spectrum cellular communication network where two CDMA waveforms are inserted into the existing NATS spectrum that is used in the Air-to-Ground Network 2. This spectral plan occurs after the narrowband or NB portion of the existing NATS architecture has been retired. This new spectrum plan enables two cellular communication systems (System 1 and System 2) to each have a dedicated 1.25 MHz slice of the existing 2 MHz NATS spectrum in both the forward path and reverse path directions of the Air-to-Ground Network 2. However, given that there is only 2 MHz of this spectrum available in each of the forward path and reverse path, this results in a 0.50 MHz overlap (40% overlap) of the two 1.25 MHz carriers in each of the forward path and reverse path. To mitigate the inter-system overlap and the potential for interference between the two systems, the overlapping spectrum cellular communication network swaps the forward and reverse path allocations on a per system basis. In particular, in the 849 to 851 MHz spectrum, a first system provides the forward path for its channels while the second system provides the reverse path for its channels and similarly in the 894 to 896 MHz spectrum where the first system provides the reverse path for its channels while the second system provides the forward path for its channels.

The two systems that are assigned the respective spectrum allocations can be independent of each other or can be two segments of the same cellular system. The term "system" as used in this context indicates the provision of cellular communication services via the assigned forward path and associated reverse path directions that are assigned to the two segments of the NATS spectrum.

Thus, the only interference potential that results from the 0.50 MHz overlap is Aircraft-to-Aircraft and Base-to-Base. Base-to-Base interference potential is easily managed by keeping the base stations physically separated by 5–10 miles. Aircraft-to-Aircraft inter-network interference is likely only in regions where aircraft separations are reduced, i.e. near airports. If the given air-to-ground links are not operated during take-off and landing cycles, than this operational scenario will not be statistically significant. However, it is desirable to operate the network at all phases of flight and therefore the Aircraft-to-Aircraft inter-network interference should be modeling using a Monte Carlo type of analysis.

There are two interference paths possible between the two overlapped spectra: aircraft-to-aircraft and base-to-base. Each has its own set of variables and associated methods to manage interference. Extensive systems modeling has identified key variables which are used to control or manage inter-network interference: base station antenna patterns, polarization isolation and physical separation. Of importance, computer modeling indicates that the two systems' 1.25 MHz CDMA carriers can actually have 100% overlap and still have the aggregate system operate with minute levels of individual network degradation (due to this perfect spectral overlap). Offsetting the waveforms improves this situation considerably.

Base-to-base inter-network interference is managed by physically separating the base of System 1 to System 2 so that the Service Area Boundary (SAB) regions do not overlap (as seen on the ground). Typically, a separation of 8–10 miles between base stations of differing networks is sufficient to create many 10's of dBs of inter-network isolation (because the base station antenna patterns are up-tilted (mechanically or electrically) and therefore have less energy being radiated directly at horizon). Additional base-to-base isolation can be realized through the use of polarization isolation (i.e. horizontal to vertical).

For aircraft-to-aircraft inter-network isolation, one element is the natural physical separations required by FAA operating rules. These physical separations include 5 miles horizontal and 1500 feet vertical separation. Additional inter-network isolation is created from using polarization isolation, such as vertical for System 1 and horizontal for System 2. In all cases, shaped base station antenna patterns that limit the antenna pattern null depths to −20 dB below beam peak are important for managing the aircraft-to-aircraft inter-network interference environment. Last, steered or tracking base antenna patterns dramatically reduce the probability of aircraft-to-aircraft inter-network interference.

Last, combinations of the above isolation elements can be creatively used to further enhance the capacity beyond just two Systems. For example, by swapping the spectrum paths for Systems 1 and 2 which are Vertically polarized and then adding Systems 3 and 4 (also spectrally swapped) as Horizontally polarized; additional spectral capacity is realized (i.e. the amount of aggregate traffic of all the networks combined, or aggregate data bits per hertz of bandwidth, can be nearly doubled).

SUMMARY

The overlapping spectrum cellular communication network functions to provide multiple cellular communication systems in the same spectrum as the existing NATS-based cellular communication system, while also providing wideband services to subscribers. To accomplish this, some spectrum overlap occurs, but swapping forward and reverse path allocations on a per system basis avoids interference problems.

What is claimed is:

1. A network for providing wireless communication services to a plurality of wireless subscriber devices that are located in an aircraft, comprising;
   air-to-ground network means having at least one transceiver located on the ground for radio frequency communications between said aircraft and a ground-based communications system via two frequency separated bands, comprising a first band and a second band, said air-to-ground network means comprising:
   first cellular system means for generating radio frequency communication signals to communicate with at least one of said plurality of wireless subscriber devices via a forward path in said first band and a reverse path in said second band;
   second cellular system means for generating radio frequency communication signals to communicate with at least one of said plurality of wireless subscriber devices via a reverse path in said first band and a forward path in said second band.

2. The network of claim 1 wherein said first cellular system means generates radio frequency communication signals having a carrier of bandwidth greater than one half of the bandwidth of said first band.

3. The network of claim 2 wherein said second cellular system means generates radio frequency communication signals having a carrier of bandwidth greater than one half of the bandwidth of said first band.

4. The network of claim 3 wherein said first cellular system means and said second cellular system means generate said radio frequency communication signals in said first band in a manner wherein said radio frequency communication signals generated by said first cellular system means and said radio frequency communication signals generated by said second cellular system means overlap in frequency.

5. The network of claim 1 wherein said first cellular system means generates radio frequency communication signals having a carrier of bandwidth greater than one half of the bandwidth of said second band.

6. The network of claim 5 wherein said second cellular system means generates radio frequency communication signals having a carrier of bandwidth greater than one half of the bandwidth of said second band.

7. The network of claim 6 wherein said first cellular system means and said second cellular system means generate said radio frequency communication signals in said second band in a manner wherein said radio frequency communication signals generated by said first cellular system means and said radio frequency communication signals generated by said second cellular system means overlap in frequency.

8. A method for providing wireless communication services to a plurality of wireless subscriber devices that are located in an aircraft, comprising:
   establishing radio frequency communications between said aircraft and a ground-based communications system via two frequency separated bands, comprising a first band and a second band, using at least one transceiver located on the ground, said step of establishing radio frequency communications comprising:

generating a first set of radio frequency communication signals to communicate with at least one of said plurality of wireless subscriber devices via a forward path in said first band and a reverse path in said second band;

generating a second set of radio frequency communication signals to communicate with at least one of said plurality of wireless subscriber devices via a reverse path in said first band and a forward path in said second band.

9. The method of claim 8 wherein said step of generating a first set of radio frequency communication signals generates radio frequency communication signals having a carrier of bandwidth greater than one half of the bandwidth of said first band.

10. The method of claim 9 wherein said step of generating a second set of radio frequency communication signals generates radio frequency communication signals having a carrier of bandwidth greater than one half of the bandwidth of said first band.

11. The method of claim 10 wherein said step of generating a first set of radio frequency communication signals and said step of generating a second set of radio frequency communication signals generate said radio frequency communication signals in said first band in a manner wherein said radio frequency communication signals generated by said step of generating a first set of radio frequency communication signals and said radio frequency communication signals generated by said step of generating a second set of radio frequency communication signals overlap in frequency.

12. The method of claim 8 wherein said step of generating a first set of radio frequency communication signals generates radio frequency communication signals having a carrier of bandwidth greater than one half of the bandwidth of said second band.

13. The method of claim 12 wherein said step of generating a second set of radio frequency communication signals generates radio frequency communication signals having a carrier of bandwidth greater than one half of the bandwidth of said second band.

14. The method of claim 13 wherein said step of generating a first set of radio frequency communication signals and said step of generating a second set of radio frequency communication signals generate said radio frequency communication signals in said second band in a manner wherein said radio frequency communication signals generated by said step of generating a first set of radio frequency communication signals and said radio frequency communication signals generated by said step of generating a second set of radio frequency communication signals overlap in frequency.

15. A network for providing wireless communication services to a plurality of wireless subscriber devices that are located in an aircraft, comprising:

air-to-ground network means having at least one transceiver located on the ground for radio frequency communications between said aircraft and a ground-based communications system via the NATS spectrum comprising two frequency separated bands, comprising a first band at approximately 849–851 MHz and a second band at approximately 894–896 MHz, said air-to-ground network means comprising:

first cellular system means for generating radio frequency communication signals to communicate with at least one of said plurality of wireless subscriber devices via a forward path within a band of approximately 849–851 MHz and a reverse path within a band of approximately 894–896 MHz;

second cellular system means for generating radio frequency communication signals to communicate with at least one of said plurality of wireless subscriber devices via a reverse path within a band of approximately 849–851 MHz and a forward path within a band of approximately 894–896 MHz.

16. A method for providing wireless communication services to a plurality of wireless subscriber devices that are located in an aircraft, comprising:

generating, using at least one transceiver located on the ground, radio frequency communications between said aircraft and a ground-based communications system via the NATS spectrum comprising two frequency separated bands, comprising a first band at approximately 849–851 MHz and a second band at approximately 894–896 MHz, said step of generating comprising:

generating a first set of radio frequency communication signals to communicate with at least one of said plurality of wireless subscriber devices via a forward path within a band of approximately 849–851 MHz and a reverse path within a band of approximately 894–896 MHz;

generating a second set of radio frequency communication signals to communicate with at least one of said plurality of wireless subscriber devices via a reverse path within a band of approximately 849–851 MHz and a forward path within a band of approximately 894–896 MHz.

17. A network for providing wireless communication services to a plurality of wireless subscriber devices that are located in an aircraft, comprising:

air-to-ground network means having at least one transceiver located on the ground for radio frequency communications between said aircraft and a ground-based communications system via two frequency separated bands, comprising a first band and a second band, said air-to-ground network means comprising:

a plurality of cellular system means for generating radio frequency communication signals to communicate with at least one of said plurality of wireless subscriber devices, using a combination of forward and reverse paths in said first band and said second band as well as first and second substantially orthogonal polarizations of said radio frequency communication signals including: first cellular system means for generating radio frequency communication signals to communicate with at least one of said plurality of wireless subscriber devices via a first forward path in said first band and a first reverse path in said second band, using a first one of said first and second substantially orthogonal polarizations, and second cellular system means for generating radio frequency communication signals to communicate with at least one of said plurality of wireless subscriber devices via a second forward path in said first band and a second reverse path in said second band, using a second one of said first and second substantially orthogonal polarizations, wherein said second forward path in said first band overlaps at least in part with said first forward path in said first band and said second reverse path in said second band overlaps at least in part with said first reverse path in said second band.

18. A method for providing wireless communication services to a plurality of wireless subscriber devices that are located in an aircraft, comprising:

generating, using at least one transceiver located on the ground, radio frequency communications between said aircraft and a ground-based communications system via two frequency separated bands, comprising a first band and a second band, said step of generating comprising:

generating a plurality of radio frequency communication signals to communicate with at least one of said plurality of wireless subscriber devices, using a combination of forward and reverse paths in said first band and said second band as well as first and second substantially orthogonal polarizations of said radio frequency communication signals including:

generating a first set of radio frequency communication signals to communicate with at least one of said plurality of wireless subscriber devices via a first forward path in said first band and a first reverse path in said second band, using a first one of said first and second substantially orthogonal polarizations, and generating a second set of radio frequency communication signals to communicate with at least one of said plurality of wireless subscriber devices via a second forward path in said first band and a second reverse path in said second band, using a second one of said first and second substantially orthogonal polarizations, wherein said second forward path in said first band overlaps at least in part with said first forward path in said first band and said second reverse path in said second band overlaps at least in part with said first reverse path in said second band.

* * * * *